Patented Apr. 20, 1937

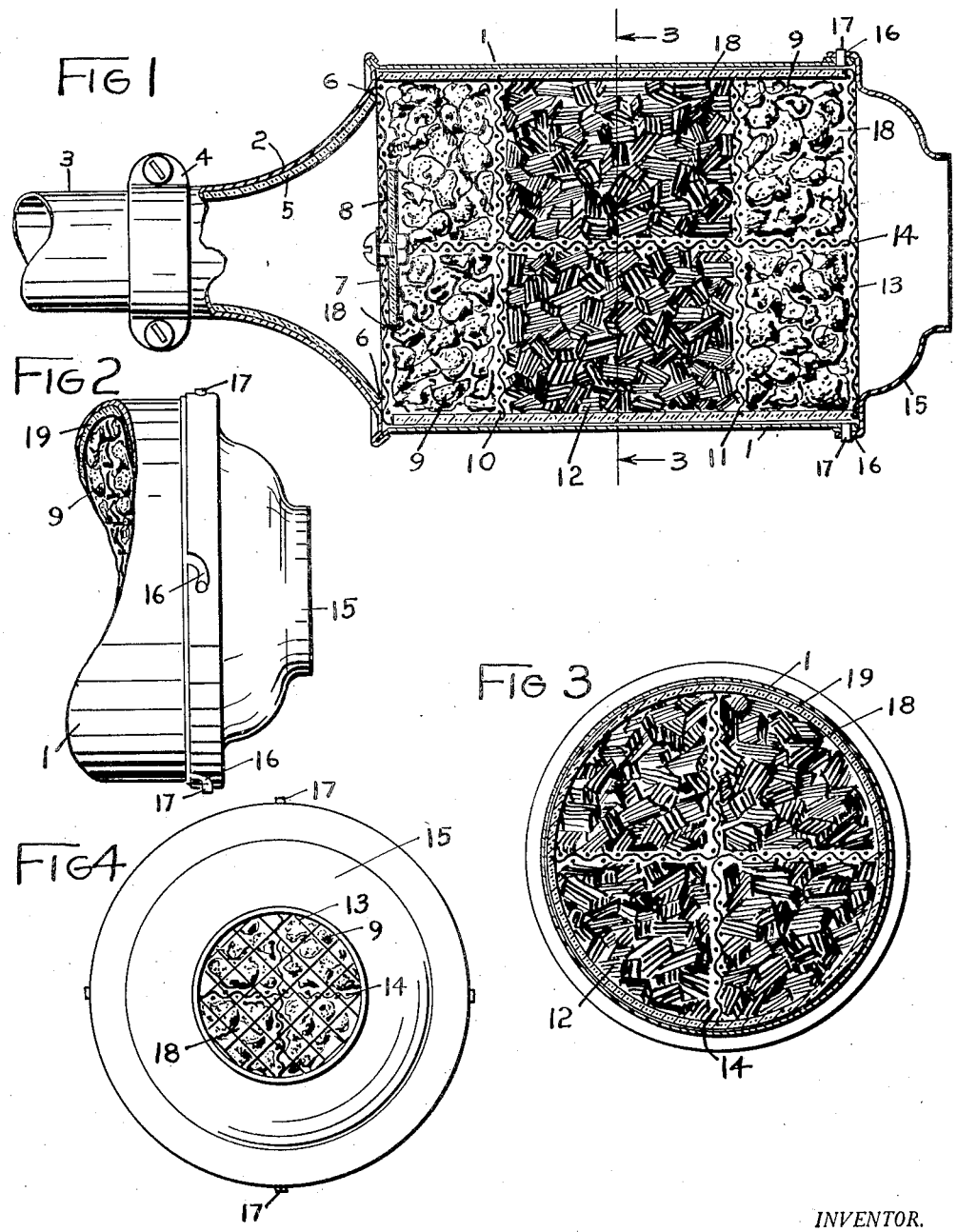

2,077,563

UNITED STATES PATENT OFFICE

2,077,563

EXHAUST FILTER AND PURIFIER

Thomas James Henry, Wilkes-Barre, Pa., assignor to National Exhaust Purifier Co. Inc.

Application May 28, 1935, Serial No. 23,809

2 Claims. (Cl. 183—49)

My invention relates to a device and certain reagents to be attached to the exhaust pipe of internal combustion engines to render harmless and substantially odorless the waste gases of combustion and partial combustion.

Among the objects are:

To apply reagents of relatively cheap form to prevent asphyxiation and death from waste gases of combustion.

To provide a container and separation partitions therein to remove monoxide, etc. by coarse pieces of blast furnace slag and charcoal without adding harmful back pressure on the engine exhaust.

To combine layers of relatively non-combustible blast furnace slag with separate layers of charcoal to react and remove monoxide from hot engine exhaust gases.

To apply charcoal as a means of removing hot monoxide gas without igniting the charcoal.

To provide a container on the exhaust pipe of combustion engines suitable for quickly and conveniently receiving packages of slag and charcoal.

I accomplish these and other objects by the construction and compositions of matter herein described and shown in the accompanying drawing in which Figure 1 is a longitudinal section of my device.

Figure 2 is a fragmentary view of the removable end piece.

Figure 3 is a section at 3 Figure 1.

Figure 4 is an end view of my device.

Similar reference characters refer to similar parts throughout the several views of the accompanying drawing forming a part hereof and in the following specifications.

My device comprising materials and container form, by reason of their properties and relationship an efficient, convenient inexpensive means of reducing the harmful poisonous gases as well as odor emitting from the exhaust from certain engines particularly those used in automobiles, trucks, buses, etc. as hereinafter more fully described. By the use of my invention death from breathing the waste gases is in most cases prevented as in the case of running the engine in enclosures and also under conditions where vehicles are enveloped by the gases of combustion while standing still with the engine running. By its use the gases change from a substantially colorless state to the appearance of steam.

The chemical changes gained by a prepared charcoal which is particularly absorbent and the slag of certain ores and available from blast furnaces in large quantities having clay-like impurities, silica and aluminum, and cupric oxides and manganese dioxides together with lime and limestone have proved to be very effective in rendering the gases of combustion practically harmless.

The body or housing (1) is preferably secured to or formed integral with the convergent neck (2) which is of the size at its smallest diameter to slip over the exhaust pipe (3) and may be detachably secured thereto by the clamp (4) or other means. The neck (2) is preferably lined with heat resisting and insulating material (5). The conjuncture of the housing (1) and neck (4) is preferably formed to provide the shoulder (6) which receives the screen (7) having a heat resisting disc (8) preferably concentrically positioned in relation to said screen (7) and pipe (3) to spread the flow of gases from said pipe and to baffle sparks as they enter the slag (9) arranged in lumps between said screen (7) and a screen (10). Between the screen (10) and a screen (11) is provided small pieces of charcoal (12) while between the screen (11) and the screen (13) another layer of slag or ore is positioned preventing back currents of air and oxygen from reaching the charcoal (12).

In some cases it is desirable to provide longitudinal screens (14) and the subdivisions depending on the size and service, between the various screens may vary in number and size and in no case is it desirable to mix the pieces of charcoal and slag which is prevented by the screens which also reduce the tendency of packing or by-passing the gases around either the slag or charcoal.

I have provided a conveniently removable end piece or outlet (15) which may be secured in place by the slots (16) and pins (17) to hold the screens and compounds in place within the housing (1).

The contents of slag and charcoal held in fixed relation in their several compartments (18) may be completely enclosed between the screens (7) and (13) and the sleeve (19) which is of a diameter slightly less than the interior of the housing (1) and of heat resisting and insulating material. A certain container is thus provided which may be easily removed and renewed as the several parts are inexpensive and may be carried as spare refills as the service demands.

I do not wish to be limited to the details herein specified as it is obvious that numerous shapes and sizes as well as the means of isolating the charcoal may be varied though particular slag and charcoal are however combined to give the best results as the absorbent charcoal provides the desired carbon to coact with slag of the composition herein set forth. I therefore, wish to depart from such details as may come within the scope of the appended claims which succinctly set forth my invention.

I claim:—

1. In a gas purifier, a housing adapted to be secured to an engine exhaust and having compounds therein for removing monoxide gas from the gases emitting from said engine exhaust, screens forming compartments spaced transversely across said housing and longitudinally with said housing to hold said compounds in fixed relation longitudinally and axially within said housing.

2. In a gas purifier, a housing adapted to be secured to an engine exhaust and having compounds therein for removing monoxide gas from the gases emitting from said engine exhaust, screens forming compartments spaced transversely across said housing and longitudinally with said housing to hold said compounds in fixed relation longitudinally and axially within said housing, an outlet having a slotted periphery and pins secured to said housing engaging said slots whereby said outlet may be quickly removed.

THOMAS JAMES HENRY.